B. D. GINN.
KNOCKDOWN CAB FOR AUTOMOBILE TRUCKS.
APPLICATION FILED JAN. 28, 1919.
1,314,865.
Patented Sept. 2, 1919.
3 SHEETS—SHEET 2.
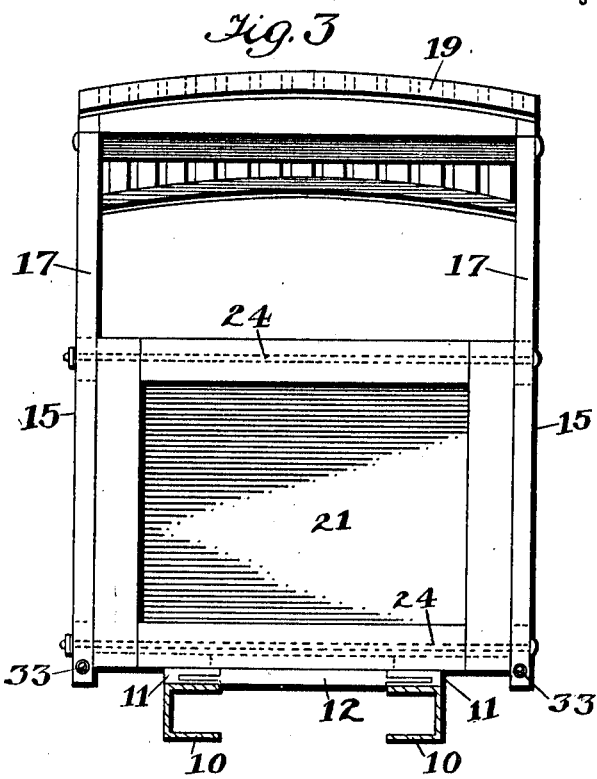
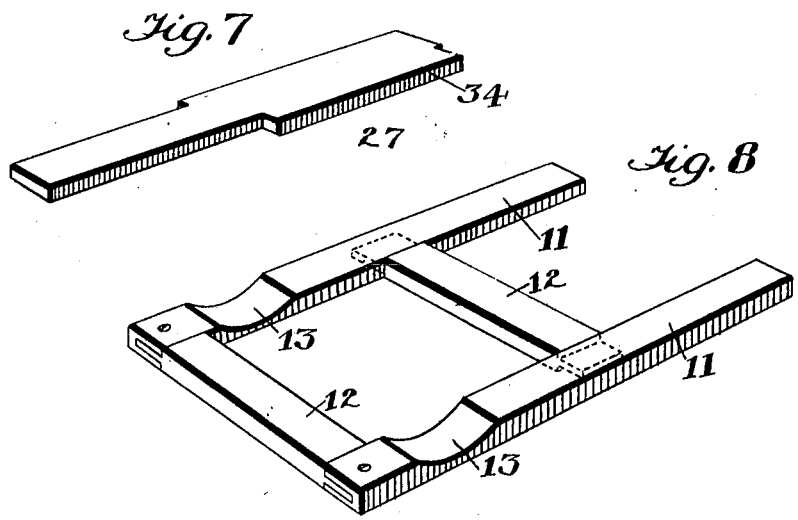
WITNESSES
George C. Nupere.
INVENTOR
Buford D. Ginn,
BY
Munn & Co.
ATTORNEYS

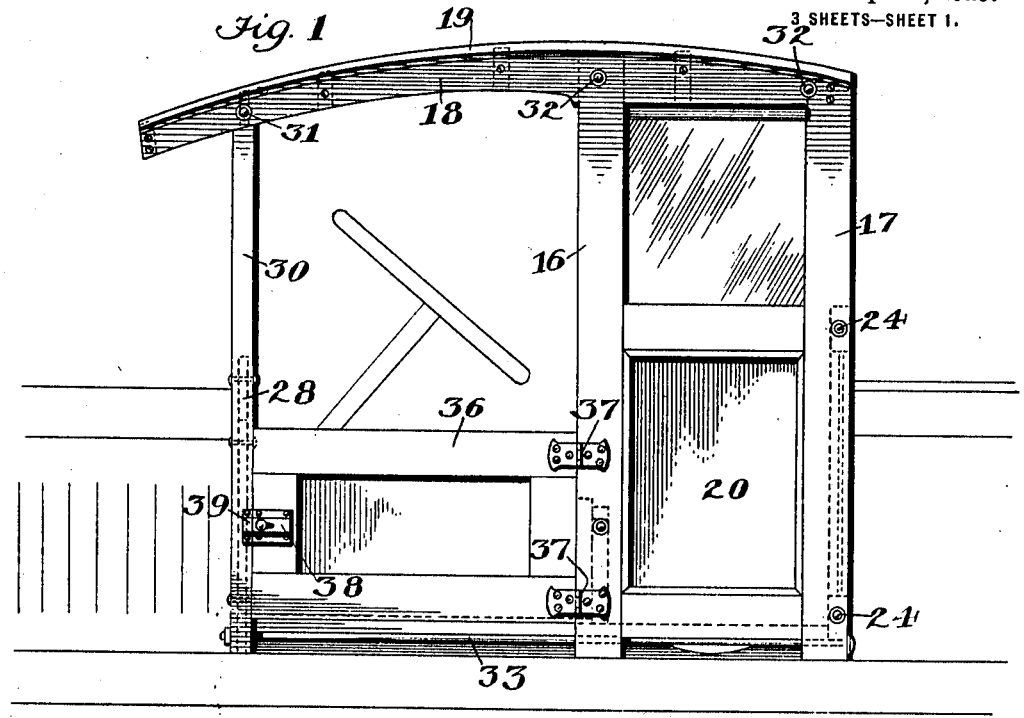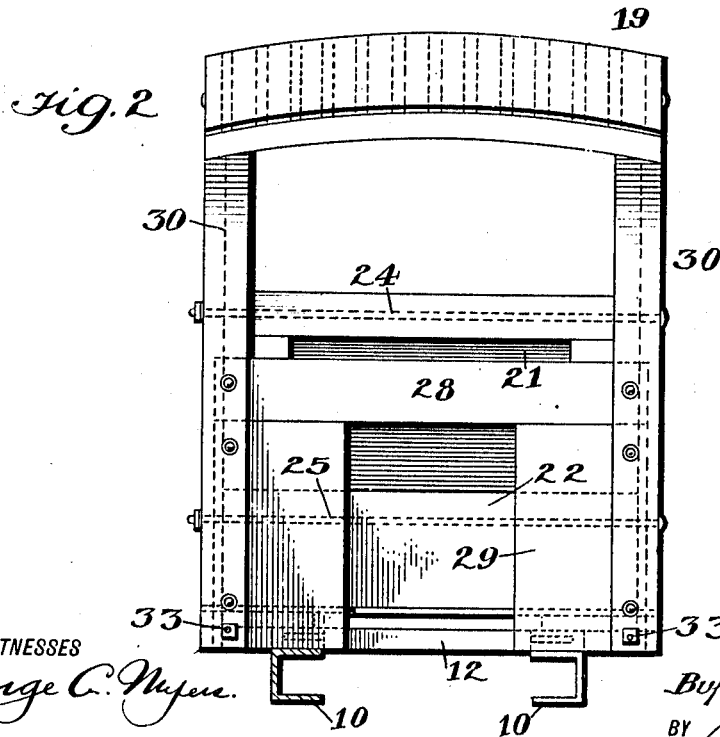

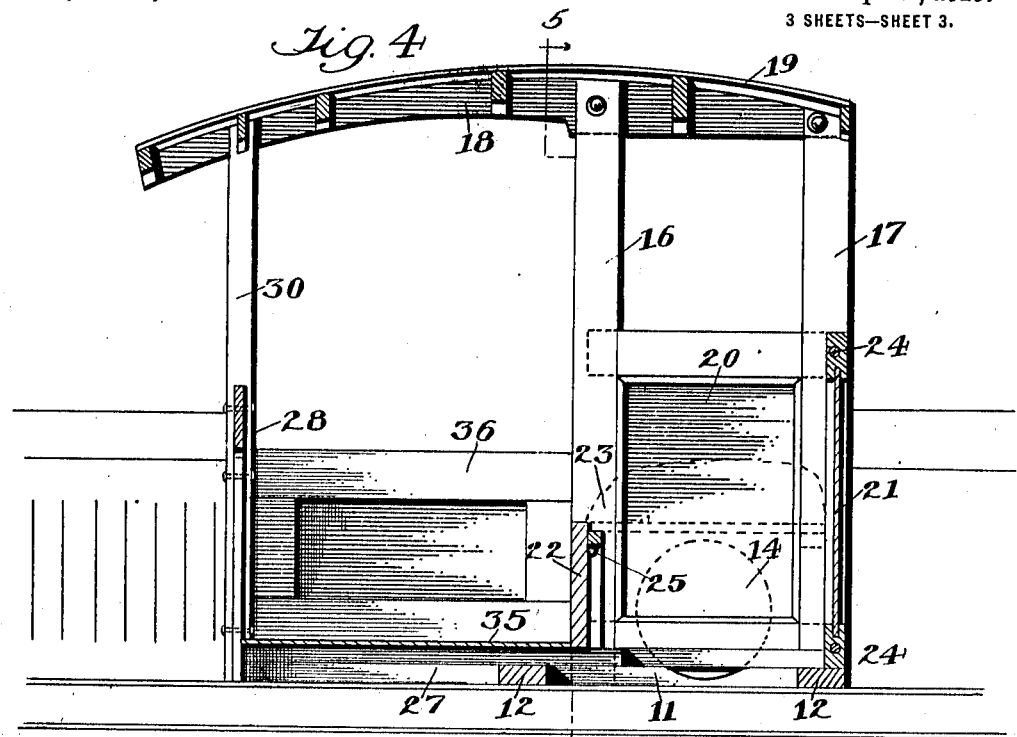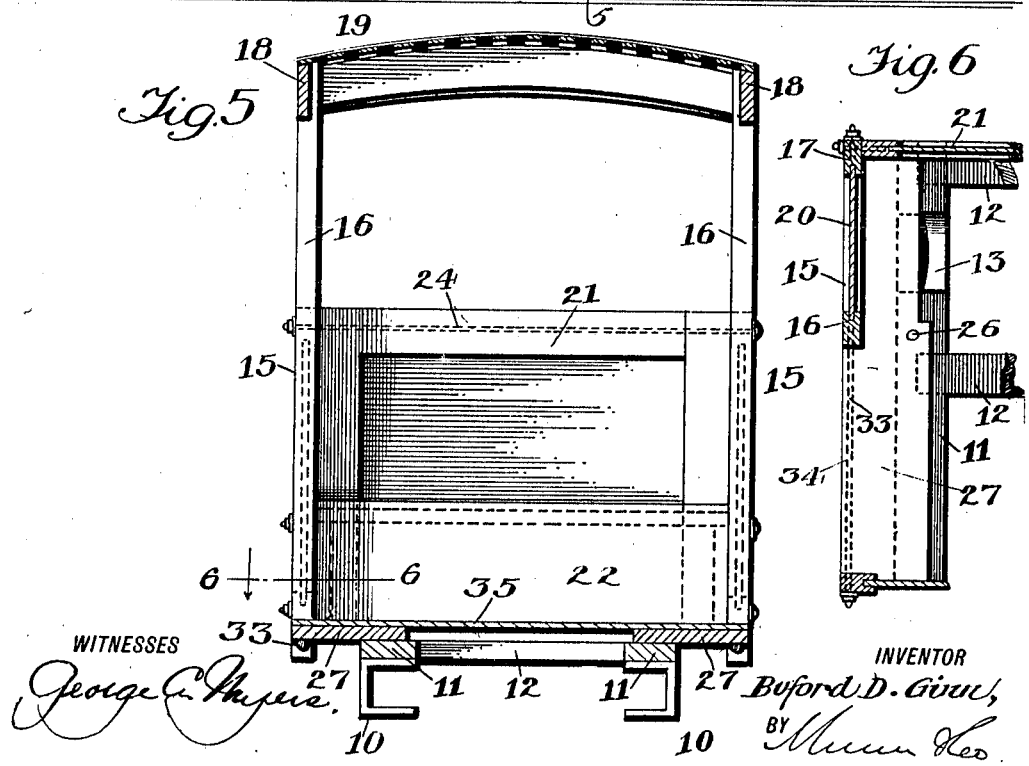

UNITED STATES PATENT OFFICE.

BUFORD D. GINN, OF CARNESVILLE, GEORGIA.

KNOCKDOWN CAB FOR AUTOMOBILE-TRUCKS.

1,314,865.      Specification of Letters Patent.     Patented Sept. 2, 1919.

Application filed January 28, 1919. Serial No. 273,533.

*To all whom it may concern:*

Be it known that I, BUFORD D. GINN, a citizen of the United States, and a resident of Carnesville, in the county of Franklin and State of Georgia, have made certain new and useful Improvements in Knockdown Cabs for Automobile Trucks, of which the following is a specification.

My present invention relates generally to automobile trucks and more particularly to cabs for automobile trucks, my primary object being the provision of a simple inexpensive and durable cab of a sectional knockdown nature, which in its knock down form may be transported in a package of minimum size, and which may be readily erected without the necessity of special tools and implements, or requiring the services of skilled mechanics or persons.

My invention therefore resides in the particular arrangement and location of the parts of the cab, together with the means providing for the detachable connection of these parts and the rigid support thereof in use, and as shown in the accompanying drawings, which form a part of this specification, and in which:

Figure 1 is a side elevation of my improved cab in position for use;

Fig. 2 is a sectional front elevation thereof;

Fig. 3 is a sectional rear elevation thereof;

Fig. 4 is a vertical longitudinal section;

Fig. 5 is a vertical transverse section taken substantially on line 5—5 of Fig. 4;

Fig. 6 is a horizontal section taken substantially on line 6—6 of Fig. 5;

Fig. 7 is a detail perspective view of one of the longitudinal spacing members, and, Fig. 8 is a detail perspective view of the base frame.

Referring now to these figures, I have in Figs. 1 to 5, inclusive, shown certain parts of the frame of a truck, for instance, a Ford truck, in which the longitudinal frame bars appear at 10, to which the cab embodying my present invention is secured.

Disposed along and suitably secured to these bars 10 is a base frame for the cab consisting of longitudinal side members 11 overlying the bars 10 and connected by cross pieces 12, between which side pieces 11 have concavely recessed upper surfaces 13 arranged to extend beneath the fuel tank seen at 14 in Fig. 4.

The frame of the cab consists of side sections 15, each of which has forward and rear uprights 16 and 17, reduced at their upper ends to receive, in lapping relation thereon, the side runners 18 of the cab roof 19, these side sections 15 each further having a lower side panel 20 and being connected at their rear by a rear panel 21 and at their forward portions by a lower seat board 22, the latter of which coöperates with the rear panel 21 and the side panels 20 in supporting the driver's seat, as seen in dotted lines at 23 in Fig. 4.

The rear panel 21 has its upper and lower bars bored to receive bolts 24 the ends of which extend through the rear uprights 17 of the side sections so that the two side sections are thus clamped in their rigidly spaced relation as shown. The seat board 22 similarly receives a bolt 25 along its upper rear portion, the ends of which bolt extend through the lower portions of the forward upright 16 of the side sections so as to clamp the forward portions of the side sections in rigidly spaced relation, the lower edge of this seat board 22 being securely fastened by screws or like fastening members 26 extending upwardly through longitudinally disposed spacing boards 27, the particular use of which will be presently described.

The cab also includes a transversely disposed front section 28 having an open front panel 29, and side uprights 30, the latter of which are engaged with portions of the longitudinally curved roof 19, and bolted thereto by bolts 31 similar to the bolts 32 connecting this roof with the upper ends of the forward and rear uprights 16 and 17 of the side sections 15, thus securing the upper portions of the front and side sections in rigidly spaced relation.

The lower ends of the uprights 30 of the front section 28 and the uprights 16 and 17 of the side sections 15 are longitudinally bored to receive lower longitudinally disposed side bolts 33, which draw the front and side sections rigidly and in spaced relation against the ends of the longitudinal spacing boards 27 before mentioned, which are disposed upon the side members 11 of the base frame between the rear panel 21 and the lower portion of the front section 28, and have projecting side portions or extensions 34 which enter the space between the forward uprights 16 of the side sections, and the side uprights 30 of the front section.

The relation of these longitudinal spacing boards 27 appears plainly by reference to Figs. 4, 5 and 6, and in Fig. 5 in particular it will be noted that the said boards are disposed in a plane above the plane of the longitudinal side bolts 33 and serve as supports for the floor planks 35, the side extensions 34 of said spacing boards overlying and concealing those portions of the longitudinal side bolts 33 lying between the front section 28 and the side sections 15, which would otherwise be exposed.

In this way the entire structure of the cab is rendered rigid and immovable by virtue of the clamping action of several bolts 24, 25 and 33, and in such manner that by removal of these bolts and the bolts 31 and 32 connecting the upper ends of the uprights 16 and 17 and 30 with the roof section 19, the entire main structure of the cab may be readily disassembled leaving only the base frame and the spacing boards 27 in connection with the frame of the truck. The bolted or otherwise formed connections between these parts may then be readily removed and the base frame and spacing boards detached, after which removal of screws 26 eliminates the last connection between the parts so they are ready for packing or storage, as may be desired.

If it is so desired lower side doors 36 may be utilized, so that the side spaces between the lower portions of the front section 28 and the panels 20 may be closed, these side doors being preferably connected by hinges 37 to the forward uprights 16 of the side sections, and having catches 38 at their opposite edges for coöperation with keepers 39 secured upon the side uprights 30 of the front section 28.

The spaces above the side panels 20 and rear panel 21, between the several uprights 16 and 17 may be glazed if so desired, after erection of the cab in effective position, and the space above the front section 28 between its side uprights 30 may be similarly glazed or may be so proportioned as to receive the ordinary Ford or other wind shield.

It is obvious from the foregoing that the parts of my improved cab in disconnected relation may be readily packed for shipment or storage to occupy minimum space, and may be erected in the position shown and described upon a truck, simply by the use of a wrench and screw and without necessitating other and special tools or the employment of skilled mechanics and persons for this purpose.

I claim:—

1. A cab for motor trucks consisting of a pair of side sections having forward and rear uprights, a seat board and a rear panel respectively extending transversely between the front and rear uprights of the said side sections, bolts extending transversely between and through the said uprights of the side sections, and coöperating with the said seat board and rear panel in securing the side sections in rigidly spaced relation, a transversely disposed front section having side uprights, longitudinally disposed spacing boards having portions extending between the said front and side sections, longitudinal clamping bolts extending through the lower portions of the uprights of the front and side sections and coöperating with the said spacing boards to rigidly connect the front and side sections in spaced relation and a roof section of rigid formation secured to the upper ends of the uprights of said front and side sections to rigidly connect the upper portions of the sections in spaced relation.

2. A cab for motor trucks consisting of a pair of side sections having forward and rear uprights, a seat board and a rear panel respectively extending transversely between the front and rear uprights of the said side sections, bolts extending transversely between and through the said uprights of the side sections, and coöperating with the said seat board and rear panel in securing the side sections in rigidly spaced relation, a transversely disposed front section having side uprights, longitudinally disposed spacing boards having portions extending between the said front and side sections, longitudinal clamping bolts extending through the lower portions of the uprights of the front and side sections and coöperating with the said spacing boards to rigidly connect the front and side sections in spaced relation, and a roof section of rigid formation secured to the upper ends of the uprights of said front and side sections to rigidly connect the upper portions of the sections in spaced relation, the said portions of said spacing boards between the front and side sections being arranged to overlie the adjacent portions of the longitudinal clamping bolts and to form supports for floor planks, as described.

3. A cab for motor trucks consisting of a pair of side sections having forward and rear uprights, a seat board and a rear panel respectively extending transversely between the front and rear uprights of the said side sections, bolts extending transversely between and through the said uprights of the side sections, and coöperating with the said seat board and rear panel in securing the side sections in rigidly spaced relation, a transversely disposed front section having side uprights, longitudinally disposed spacing boards having portions extending between the said front and side sections, longitudinal clamping bolts extending through the lower portions of the uprights of the front and side sections and coöperating with the said spacing boards to rigidly connect the front and side sections in spaced relation, a roof section of rigid formation secured to the upper ends of the uprights of said front and side sections to rigidly connect the upper portions of the sections in spaced relation, and side doors hinged at their rear edges to the forward uprights of the side sections, and engageable with the side uprights of the front sections in closed position.

4. A cab for motor trucks consisting of a pair of side sections having forward and rear uprights, a seat board and a rear panel respectively extending transversely between the front and rear uprights of the said side sections, bolts extending transversely between and through the said uprights of the side sections, and coöperating with the said seat board and rear panel in securing the side sections in rigidly spaced relation, a transversely disposed front section having side uprights, longitudinally disposed spacing boards having portions extending between the said front and side sections, longitudinal clamping bolts extending through the lower portions of the uprights of the front and side sections and coöperating with the said spacing boards to rigidly connect the front and side sections in spaced relation, a roof section of rigid formation secured to the upper ends of the uprights of said front and side sections to rigidly connect the upper portions of the sections in spaced relation, said spacing boards being secured to the said seat board, and a base frame below the said spacing boards and to which the latter are also secured for the purpose described.

5. A cab for motor trucks comprising a horizontally disposed base frame including longitudinal side members for connection with the frame of a motor truck, a pair of vertically disposed side sections, each having forward and rear uprights, a vertically disposed seat board and a similarly disposed rear panel respectively extending transversely between the forward and rear uprights of the said side sections, forward and rearward transverse clamping bolts extending between and through the forward and rear uprights of the side sections adjacent the seat board and panel, and coöperating with the latter to rigidly clamp the side sections in spaced apart relation, the upper and lower portions of the rear panel being bored to receive the rear transverse bolts, a vertically disposed front section extending transversely in spaced relation to the side sections and having side uprights, spacing boards disposed horizontally above the base frame and along opposite sides of said base frame between the front section and the rear panel and having portions thereof extending between the side uprights of the front section and the forward uprights of the side sections, longitudinal clamping bolts extending through the lower portions of the uprights of the front and side sections in a plane below that of the said spacing boards, and coöperating with the latter to rigidly clamp the front and side sections in spaced apart relation, and a rigid roof section having side runners bolted at spaced points to the upper ends of the said uprights to rigidly space the upper ends of the sections apart.

BUFORD D. GINN.

Witnesses:
O. D. HALL,
R. B. MOORE.

Copies of this patent may be obtained for five cents each, by addressing the "Commissioner of Patents, Washington, D. C."